United States Patent [19]
Bernhardt et al.

[11] 4,336,611
[45] Jun. 22, 1982

[54] ERROR CORRECTION APPARATUS AND METHOD

[75] Inventors: Donn E. Bernhardt; Lowell D. McCulley, Jr., both of Phoenix, Ariz.

[73] Assignee: Honeywell Information Systems Inc., Phoenix, Ariz.

[21] Appl. No.: 99,351

[22] Filed: Dec. 3, 1979

[51] Int. Cl.³ ............................................. G06F 11/10
[52] U.S. Cl. .................................................... 371/38
[58] Field of Search .............................. 371/38, 13, 51

[56] References Cited
U.S. PATENT DOCUMENTS

| | | | |
|---|---|---|---|
| 4,058,851 | 11/1977 | Scheuneman | 371/38 |
| 4,112,502 | 9/1978 | Scheuneman | 371/38 |
| 4,225,959 | 9/1980 | Suelflow et al. | 371/38 |
| 4,249,253 | 2/1981 | Gentili et al. | 371/38 |

*Primary Examiner*—Charles E. Atkinson
*Attorney, Agent, or Firm*—Wm. W. Holloway, Jr.; L. J. Marhoefer; N. Prasinos

[57] ABSTRACT

An apparatus and method correcting data groups within a data stream to form a corrected data stream and providing for selecting between the data stream and the corrected data stream as desired.

10 Claims, 6 Drawing Figures

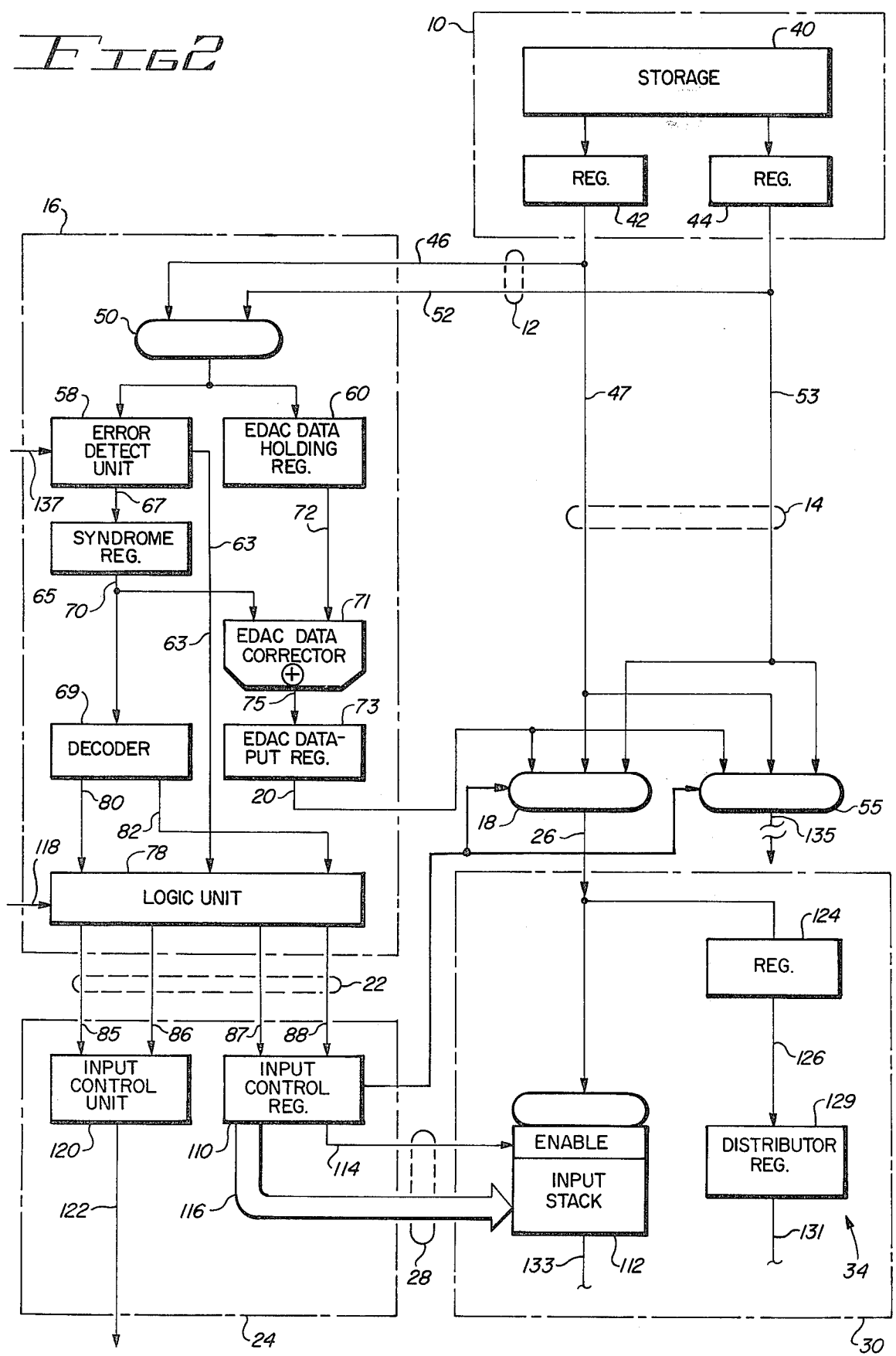

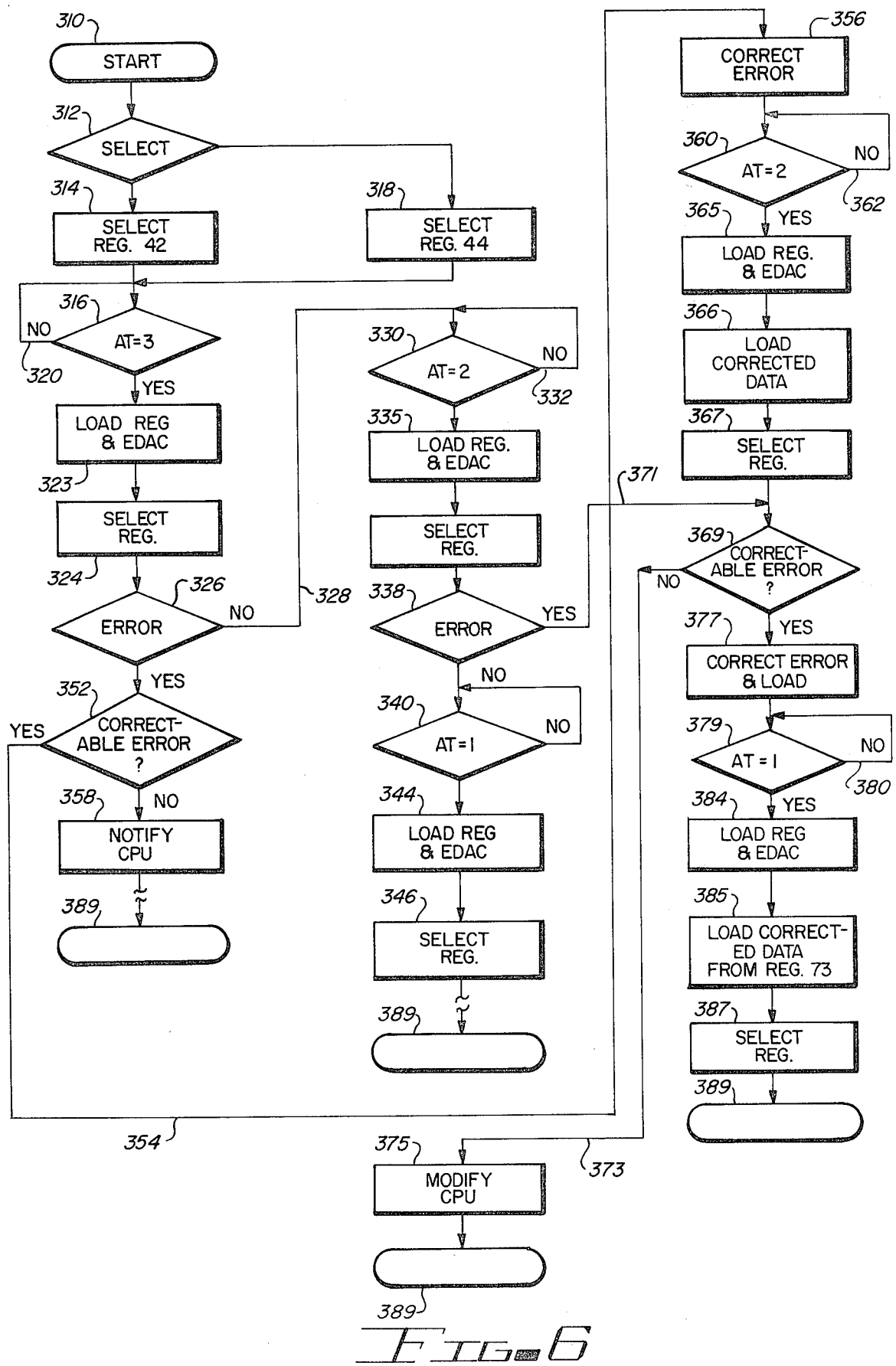

ERROR CORRECTION APPARATUS AND METHOD

BACKGROUND OF THE INVENTION

1. Field of the Invention

This invention relates generally to data processing systems, and more particularly, to a method and apparatus for providing a corrected data group to a destination circuitry.

2. Description of the Prior Art

As is well known in the art, various components of data processing systems must communicate. Various errors, for example, caused by the presence of noise or equipment failure can occur. Thus, incorrect data groups can be transmitted between various components of the data processing system. For example, data processing systems generally utilize signals corresponding to a high level and a low level state. Noise or equipment faults can cause a high state to be received when a low state was, in fact, transmitted.

A data group or word group consists of a plurality of high and low levels, which are generally referred to as "1" and "0", respectively. For example, the three bit word "101" correctly represents the quantity 5. If an error occurs during transmission, the code group can be received as "100", which is the quantity 4. Various codes were developed to allow both the detection and correction of errors.

It is known in the art to employ error detection and correction apparatus to check and correct the data supplied from the main memory for distribution to other components, such as the central processing unit of the data processing system.

In general, the error detection and correction apparatus was employed to correct errors prior to the data group being presented to the central processing unit. An example of this type of apparatus is shown in the U.S. Pat. No. 4,058,851 issued to Scheuneman on Nov. 15, 1977 and entitled "Conditional By-Pass of Error Correction for Dual Memory Access Time Selection". Scheuneman shows and describes a system wherein the main memory provides each data group read to both an error correction apparatus and an interface register. If the error can be corrected, the requestor, such as the central processing unit, is notified and the data group is again read from the memory. The output of the error correction apparatus, if the error correction apparatus indicates that the error is correctable, is supplied to the interface register and finally, to the requestor such as the central processing unit. Thus, the uncorrected data which contains an error is not transmitted to the requesting unit. The requesting unit must again address that data group within the main memory and then receive the corrected data.

It is also known to apply the data group from the memory to a data switch and to an error detection and correction circuitry. The data switch then selects either the data group from the memory or the corrected data group from the error detection and correction circuitry. Another type of system is shown generally in U.S. patent application Ser. No. 930,965 by Suelflow et al, now abandoned. As the speed of operation of the various components of the data processing system increase, it is desirable that the data not be delayed during the time the error and correction circuitry is performing its function.

None of the constructions shown in the prior art show and describe apparatus for supplying a corrected data group from a memory to a destination circuitry which allows the uncorrected data to continue on to the destination circuitry through a data switch and the corrected data group along with subsequent data groups being received from the error correction and detection circuitry through the data switch.

SUMMARY OF THE INVENTION

Data groups which represent information addressed within a memory are provided as an output thereof to form a stream of data groups. The data groups are arranged by the memory into a predetermined sequence which can be, for example, a sequence called for by a destination circuitry such as a central processing unit. The data groups in that predetermined sequence are provided simultaneously to an error detection and correction circuitry and a data switch by the memory. The data stream thus follows two paths to the destination circuitry.

The data switch provides the data groups to a destination circuitry, for example, a central processing unit. The error correction and detection circuitry includes a register receiving the data groups in said predetermined sequence and an error detection and correction unit. Both the holding register and the error detection and correction unit receive the data groups in the predetermined sequence. The output of the holding register is supplied to an error detection and correction unit and to an error detect unit. The error detect unit determines whether or not the data group contains an error. A syndrome signal is applied by the error detect unit to a syndrome register if an error is detected. The syndrome signal indicates to the data corrector, if the error is correctable, which data bit in said data group must be altered. The error detect unit also outputs an error signal indicating that an error has been detected in the data group. The syndrome register has its output connected to both the data corrector and a decoder. If the error is correctable, the corrector utilizes the syndrome signal to alter the bit indicated within the data group. The output of the data corrector which is the corrected data group, is transferred to an output register. Thus the corrected data group has replaced the data group in error within the data stream.

The output register is in turn connected at its output to the data switch. Therefore, the data switch is in electrical communication with the output register of the EDAC apparatus and can selectively output the data groups from the memory or alternatively the data groups loaded into the output register of the error detection and correction apparatus. Even if the syndrome signal indicates that none of the data bits need to be altered, i.e., the data group does not contain an error, the data group is passed intact from the memory through the holding register, the data corrector and the output register to the data switch.

As set forth above, the output of the syndrome register is also connected to the decoder which receives the syndrome signals therefrom. The output of the decoder indicates whether or not the particular error indicated by the syndrome signal is correctable or uncorrectable. The output of the decoder and the error signal from the error detect unit are connected to a logic unit which provides signals indicating that an error exists and whether the error is correctable or uncorrectable at its outputs. The logic unit provides the signals to a control unit. Some of the outputs of the logic unit are delayed by one or more clock pulses from receipt thereof. A control unit connected to the logic unit utilizes the outputs of logic unit to control the data switch and to inform the destination circuitry such as a central processing unit that the data group does not contain an error or if an error is contained, whether or not the error is correctable. If the error is uncorrectable the central processing unit can abort the operation and initiate another request for the data group from the memory or utilize any other recovery system which is appropriate.

It is an advantage of the present invention in that, after an error is detected and corrected in one data, the data switch continues to provide the output of the error correction and detection circuitry, which comprises the data stream in the predetermined sequence, to the destination circuitry.

BRIEF DESCRIPTION OF THE DRAWINGS

FIG. 2 is a more detailed block diagram of the components shown in FIG. 1;

FIGS. 4, 5 and 6 are illustrations of flow diagrams of a functional description for the operation of the apparatus within the present invention.

DESCRIPTION OF THE PREFERRED EMBODIMENT

Figure 1:
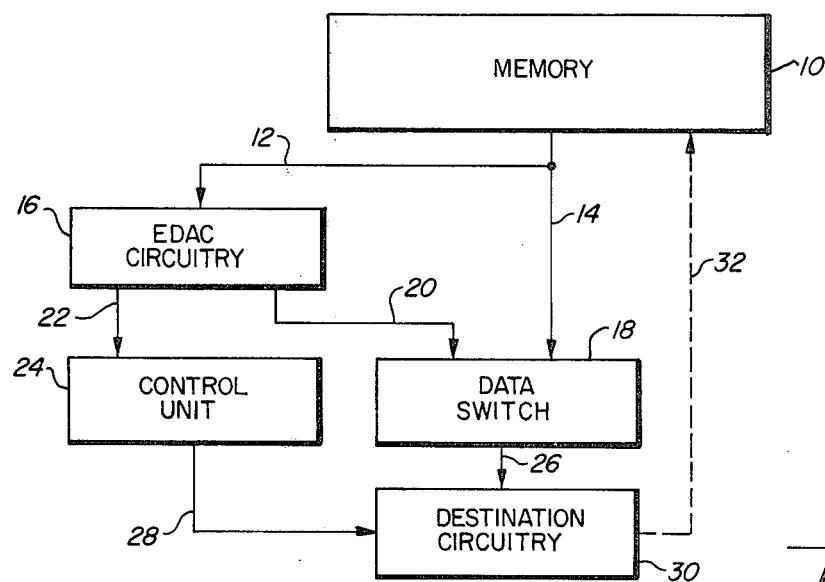
FIG. 1 is a block diagram showing the basic components of the present invention with associated elements.

With specific reference to FIG. 1, a memory 10 has its outputs connected through multiline channels 12 and 14 to error detection and correction (hereinafter referred to as EDAC) circuitry 16 and to a data switch 18, respectively. It should be noted that, although the multiline channels in FIGS. 1 and 2 are shown as a single line, they are actually comprised of a plurality of lines so that the data groups can be transferred in parallel. The circuitry of FIG. 1 can be adapted to a single line for each channel with serial transfer.

The data switch 18 is connected to receive the output of EDAC circuitry 16 through multiline channel 20. EDAC circuitry 16 is also connected at its output through multiline channel 22 to a control unit 24. The data switch 18 and the control unit 24 are connected through multiline channels 26 and 28, respectively, to a destination circuitry 30. Destination circuitry 30 can be any type of circuit utilizing data groups but, as discussed hereinafter, destination circuitry 30 is, as shown in FIG. 2, a central processing unit 34 (FIG. 2) of a data processing system. The destination circuit 30 can be adapted to provide the addressing for the data group and thereby generate the sequential order in which the memory provides the data groups stored therein via multiline channel 32.

As shown in FIG. 2, memory 10 includes a storage unit 40 and data registers 42 and 44. A storage unit 40 is divided into two sections, one of which applies data groups to upper memory data register 42 and the other of which supplies data groups to lower memory data register 44. Each data block within storage unit 40 to be discussed in detail herebelow, contains data group in both of the sections of the storage unit. Thus, as a block of data is addressed, data groups within the block are located and stored within data registers 42 and 44. The sequence for storage and retrieval of the data groups stored into the data registers can be specified by central processing unit 34.

The output of data register 42 is connected through multiline channels 46 and 47 to EDAC switch 50 (within EDAC circuitry 16) and data switch 18, respectively. Data register 44 is connected through multiline channels 52 and 53 to EDAC switch 50 and data switch 18, respectively. Data registers 42 and 44 are also connected at their outputs through multiline channels 47 and 53, respectively, to another data switch 55.

Multiline channels 47 and 53 comprise the multiline channel 14 of FIG. 1. Multiline channels 46 and 52 comprise the multiline channel 12 of FIG. 1. EDAC switch 50 which operates substantially identically to switches 18 and 55, is capable of selecting as the output thereof the contents of register 42 or 44 through their prospective channels. The data switches can be of any type generally known for selecting between two or more sets of inputs as the output thereof. The selected output of EDAC switch 50 is applied to the inputs of both error detect unit 58 and holding register 60. The output of data switch 50 is loaded into holding register 60 one data group at a time. Therefore, the output of either data registers 42 or 44 as selected is loaded into holding register 60. Error detect unit 58 also receives the outputs of data registers 42 and 44 through EDAC switch 50. Error detect unit 58 examines the data group from EDAC switch 50 for errors. An example of minimum distance error correction codes is set forth in Hamming, "Error Detecting and Error Correcting Codes", Bell System Technical Journal, Volume 29, 1950, pages 147 and 160, which is incorporated herein by reference.

The error correction code is not loaded into holding register 60. The error correction code is only provided to unit 58 through data switch 50.

The data bits of the data group are examined to determine if the correct parity is present and the data bits representing data are correct for the error correction code. If an error has occurred, error detect unit 58 outputs a signal so indicating on line 63. A syndrome signal is also generated by error detection unit 58. The syndrome signal is stored into syndrome register 65 through multiline channels 67. The syndrome signal stored in syndrome register 65 is connected to decoder 69 and EDAC data corrector 71 through multiline channel 70. Data corrector 71 also is connected to receive the output of holding register 60, which comprises the data group stored therein, through multiline channel 72. Corrector 71 utilizes the output of syndrome register 65 to correct the data stored in holding register 60 if an error is present and is correctable.

The syndrome signal from register 65 points to a specific data bit within the data group, if the error is correctable, stored in holding register 60. That data bit is altered to provide as an output of corrector 71, a corrected data group wherein the data bit in error has been corrected. If for example, the error existed in bit 9 of the data group, and that bit was currently a "1" corrector 71 would change bit 9 to "0". The output of corrector 71 is loaded into EDAC output register 73 through multiline channel 75. The corrected data group is transferred through multiline channel 20 from output register 73 to data switches 18 and 55. If the data group within holding register 60 does not contain an error data corrector 71 passes the data from holding register 60 without alteration and that data group is loaded into output register 73. Thus, a data group which does not contain an error can be passed to data switch 18 either through the path provided by multiline channel 47 or through the path including the EDAC circuitry. The data switch can select either path as the output of data switch 18 to the central processing unit 34.

As discussed above, decoder 69 provides outputs to a logic unit 78. Logic unit 78 also receives the error signal from error detect unit 58 through line 63. Decoder 69 is adapted to receive the syndrome signal from register 65 and decode that signal to determine if the error is a correctable error or an uncorrectable error.

If the error cannot be corrected (an example which will be given herebelow) decoder 69 so indicates to logic unit 78 through line 80. If the error is correctable, decoder 69 so indicates through line 82 to logic unit 78. It should be noted that the output of error detect unit 58, which indicates that an error exists, occurs on one clock pulse and the output of decoder 69 to lines 80 and 82 occurs on the next clock pulse.

Logic unit 78 supplies outputs to control unit 24 through lines 85 through 88 which comprise channel 22. Lines 87 and 88 are connected to an input control register 110. The output of control register 110 is connected through multiline channel 28 to the input stack storage unit 112. Control register 110 is also coupled to data switch 18 and data switch 55 for determining which input to each data switch will pass through the switch. Multiline channel 28 includes a line 114, and the write address channel 116. Input control register 110 provides a write enable signal to line 114 that a corrected data group is contained in EDAC output register 73. The signals from register 110 to channel 116 indicate the address of the uncorrected data which corresponds to the corrected data group in register 73 within input stack storage unit 118. The address or write signal is provided to input control register 110 from logic unit 78 through lines 87 and 88. Thus the corrected data is written over the uncorrected data in the input switch. Other arrangements such as dropping the uncorrected data from the stack and placing the output of register 73 in the next available storage position are of course possible. The address where each data group is to be stored is inputted to logic unit 78 through multiline channel 118. The two remaining outputs of logic unit 78 to lines 85 and 86, which indicate error present and uncorrectable respectively, are connected to input control unit 120.

Input control unit 120 supplies an output to line 122 which allows the central processing unit to utilize the data group. Input control unit 120 informs the central processing unit that a particular data group is in error and the data group containing the error is not released. If the data is uncorrectable the central processing unit is so informed and will not utilize the uncorrected data. If the error is uncorrectable then the operation is aborted and various recovery measures which can be any, as known in the art, are undertaken.

The output of data switch 18 is connected through multiline channel 26 to input stack storage unit 112 and by-pass register 124 of central processing unit 34. The function of by-pass register 124 is to delay the passage of the data one clock pulse. The output of by-pass register 124 is connected through multiline channel 126 to distributor register 129. During the next clock pulse, the data group stored in by-pass register 124 is loaded into distributor register 129. Prior to the data group within distributor register 129 being transferred for use in the central processing unit, the output of input control unit 120 to line 122 is utilized to determine if the data contains an error. If the data is not in error, then the information is transferred from distributor register 129 for use in other components of the central processing unit (not shown). If the information within distributor register 129 is in error, the data group within distributor register 129 is not utilized and during the next clock pulse, the data group within by-pass register 124 is loaded thereinto. The recovery procedures are then utilized.

The output of distributor register 129 is connected through multiline channel 131 to the other components of the central processing unit 34, for example, the instruction register (not shown). Input stack storage unit 112 can have its output connected through multiline channel 133 to the cache memory (not shown) of central processing unit or any other component. Data switch 55 is connected through multiline channel 135 to another distribution circuitry (not shown) such as another CPU.

Figure 3:
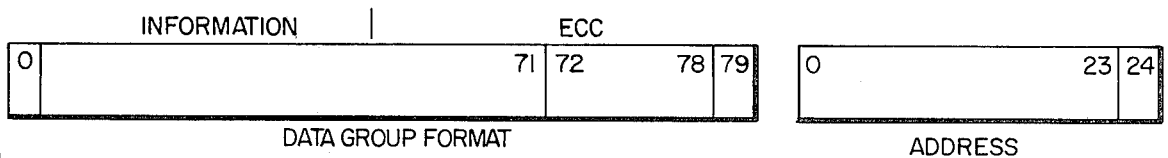
FIG. 3 is an illustration of the format of a data group and an address stored within the memory.

With particular reference to FIG. 3, there is illustrated a data group having the length of 80 bits (0–79). The particular data group and address as shown in FIG. 3 is by way of example only and any suitable arrangement can be utilized. Bits 0 through 71 of the data group contain the information, either data or instructions, stored in the storage unit 40 (FIG. 2). Bits 72 through 78 represent an error correction code which was generated when the data group was stored into storage unit 40 (FIG. 2). The error correction code is any one of the types of codes known in the art. Although a specific example of the particular type of coding is set forth herebelow, any type, as known in the art, can be utilized. Data bit 79 is an overall parity bit for both the information in bits 0–71, the error correction code 72 through 78, and the first 24 bits 0–23, of the address of the data group. The first 24 bits of the address of the data group is also utilized along with the information bits 0 through 71 to generate the error correction code of the bits 72 through 78 when the data group is stored into storage unit 40. The error correction code and the information of the data group is provided along with the address of the data group to error detect unit 58. The address is stored in a register (not shown) and applied to unit 58 when required through channel 137. Error detect unit 58 utilizes bits 72 through 79 to determine if any of the bits 0 through 71 of the data group are in error or if bits 0 through 23 of the address are in error.

In the following example, the bits are not represented by 1's and 0's, but are in octal and therefore each numeral represents the equivalent of three binary bits. The data group for example is 123,456,701,234-070,505,030,101. The data within the memory 10 can be provided in blocks of four groups each. It can be desirable in some applications to specify the ordering of the data groups within the four, 80 bit, data group block to be supplied to the central processing unit. The address for the particular data group is 3262,274,153.

The error correction code for the combination is 032. This is generated prior to entry into storage unit 40. Assuming that bit 19 of the first data word is 0, which is an error, detected within error detect unit 58, a syndrome signal is generated and stored into syndrome register 65 by error detect unit 58. This error signal is decoded by corrector 71 so that data bit 19 of the data group stored in holding register 60 is inverted. Thus, signal data bit 19 is an "0", corrector 71 changes bit 19 to "1". The corrected data group is stored into output register 73.

Figure 4:
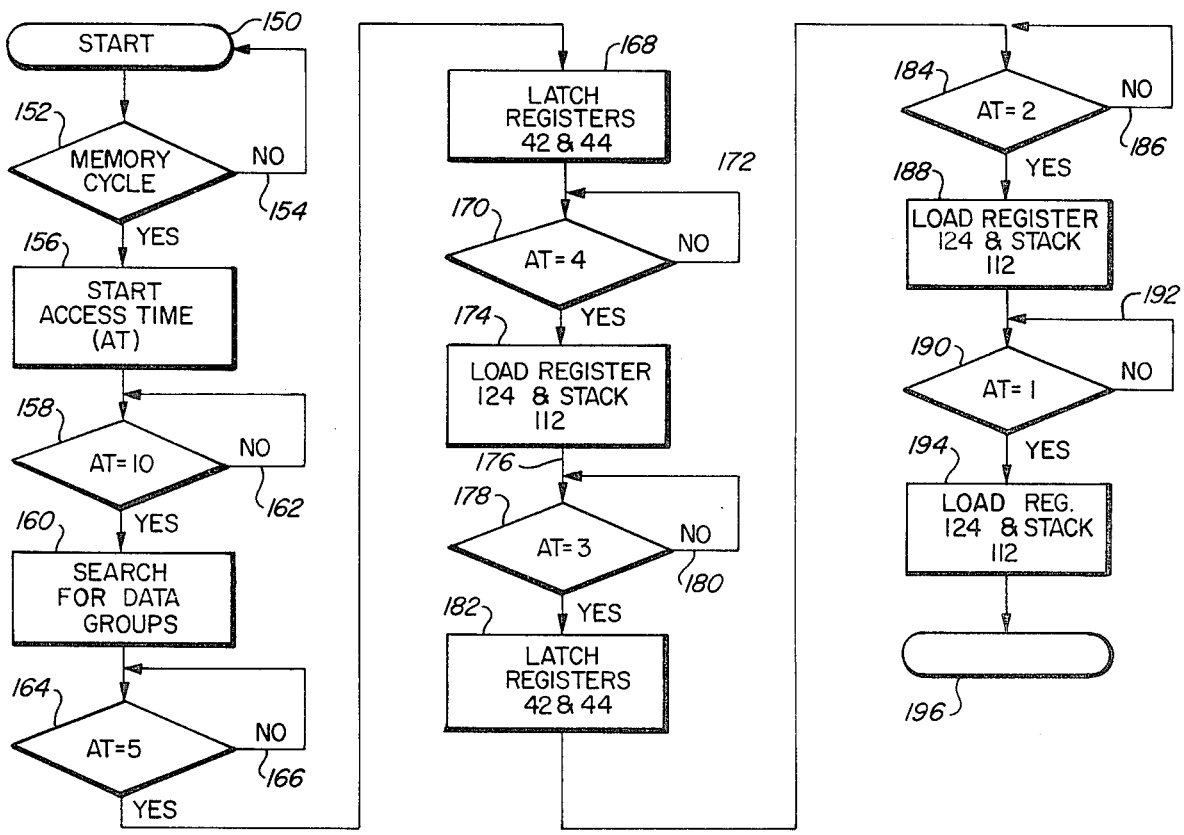
Figure 5:
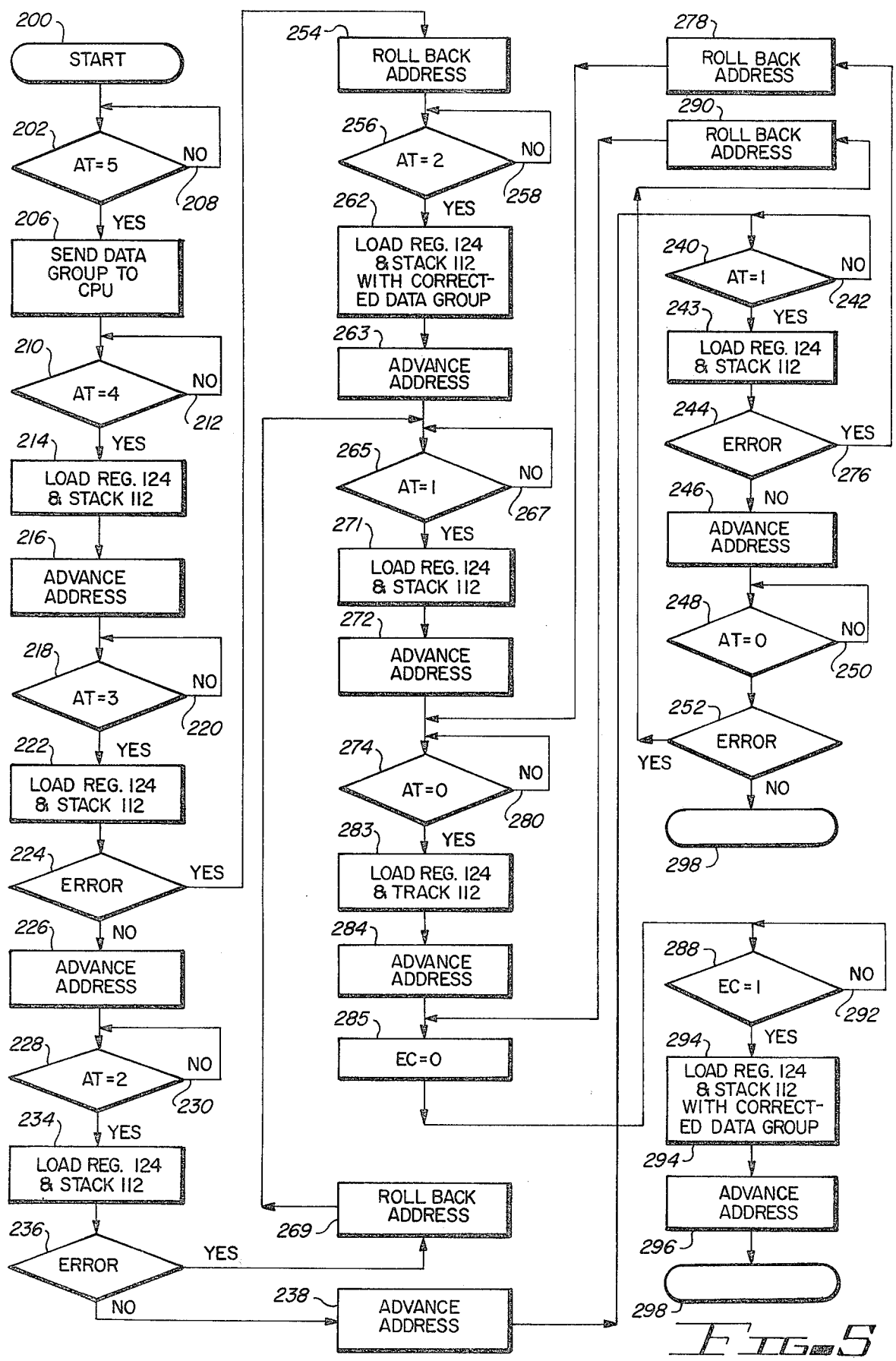

The utilization of the address by the error detection and correction apparatus has been found useful but can be omitted if desired. The address is supplied to Error detect unit 58 via input 137. If, for example, the address bit 23 is equal to "1" due to an address decode failure in memory 10, error detect unit 58 then produces another syndrome signal. Corrector 71 attempts to decode this error syndrome signal; however, it will be unable to do so because the only bits that it corrects are those of the data group stored within holding register 60. Decoder 69 decodes this error as uncorrectable and so indicates via a signal to line 80. The logic unit 78 then performs its function of distributing and providing the necessary signals to Control unit 24. In the first example, where the syndrome signal indicated a correctable error, decoder 69 so indicates to logic unit 78 through line 82. The logic unit 78 then indicates the corrected data group present within output register 73 to control unit 24. The insertion of the corrected data group into the data stream produces a corrected data stream as the output of corrector 71. The sequence of the data group is maintained for the subsequent data group. Data switch 10 continues to pass the output of output register 73 to CPU 34 until a request is made by the other CPU (not shown) to receive data groups on line 135 through data switch 55. Data switch utilizes the data groups in channel 14 until an error is detected and corrected. The corrected data stream is then utilized. FIGS. 4, 5 and 6 are flow diagrams of the operation of the various portions of the apparatus shown in FIG. 2. Two devices which are not shown in FIG. 2 are called for in the operation of FIGS. 4, 5, and 6. These devices are a number of access times and an extension counter which can be located, for example, within the memory 10 or an extension counter, or within the error detection and correction (EDAC) circuitry 16. One access timer is started and blocks of four data groups is requested from memory 10.

The logic for loading the data groups from the memory into the central processing unit 34 is shown in FIG. 4. The logic begins in state 150 and proceeds from state 150 and enters into state 152. Within state 152 a test is made to determine if a request for data groups to be read from the memory has occurred. If such a request has not occurred the logic cycles through path 154 and re-enters state 150. If a memory cycle has occurred the logic proceeds from state 152 and enters step 156. Within step 156 the access timer, (hereinafter designated in the figures AT is started at some convenient number greater than 10. The logic then proceeds from step 156 and enters into state 158. In state 158 a test is made of the output of the access timer to determine if the value of the timer is equal to 10. If the output is equal to 10 logic proceeds from state 158 and enters into step 160. If the access timer is not equal to 10, the logic recycles through path 162 and re-enters state 158. Within step 160 the storage unit 40 (FIG. 2 is searched for the requested data groups. As the search proceeds the logic enters into state 164. Within state 164 the output of the access timer is examined to determine if the timer has counted down to 5. If the output of the access timer does not equal 5 to logic recycles through path 166 and returns to state 164. When the access timer reaches an output equal to 5, the logic proceeds from state 164 to step 168. The interval between the access timer having its output equal to 10 and its output equal to 5 is sufficient for a complete search of the storage unit 40 and the location of the requested data groups.

In step 168 two data groups are latched into registers 42 and 44. Logic then exits step 168 and enters into state 170. Within state 170 the output of the access timer is again examined. If the output of the access timer is not equal to 4, the logic recycles through path 172 and re-enters state 170. When the output of the access timer is equal to 4, the logic proceeds from state 170 and enters into step 174. In step 174 registers 124 and stack storage unit 112 are loaded with one data group at a time from either registers 42 or 44 in a certain sequence. The logic then continues through path 176 and enters into state 178. In state 178 the output of the access timer is tested to determine if the access timer has counted down to 3 as yet. If the output is not equal down to 3 the logic recycles through path 180 and re-enters state 178. When the access timer reaches 3 the logic exits from state 178 and enters step 182 In step 182, register 124 and input stack storage unit 112 are loaded with the data groups in either registers 42 or 44 which was not loaded in step 174 and registers 42 and 44 are again latched with the output of storage unit 40. It should be noted that in the discussions which follow four data groups at a time are accessed from the memory in a set; however, this is exemplary only and any number or a continuous flow of data groups from the memory can be utilized with the present invention.

After the next two data groups are latched into registers 42 and 44 logic proceeds from step 182 and enters into state 184. Within state 184, the output of the access timer is again examined. If the access timer has not yet counted down to 2, the logic cycles through path 196 and re-enters state 184. However, if the access timer has counted to 2 the logic proceeds from state 184 and enters step 188. Within step 188, one data group within registers 42 and 44 is loaded into register 124 and input stack storage unit 112 in a predetermined sequence. The logic then proceeds from step 188 and enters state 190. In state 190, the access timer is examined to determine if it has counted down to one. If it has not, the logic cycles through path 192 and re-enters state 190. If the access timer has counted to one, the logic passes through step 194 and enters state 196. In step 194, register 124 and input stack storage unit 112 are loaded with the data group not loaded in step 188.

The sequential operation of control unit 24, CPU 34, and data switch 18 are described in the flow diagram of FIG. 5. Basically, FIG. 5 shows the loading of the data groups and the replacement of data groups in error within the input stack storage unit 112. It should be noted however that if data is in error that data group does not pass through channel 131 from distribution register 124 and does not become an input to the other components of the central processing unit 34. The logic of FIG. 5 begins in state 200. Logic proceeds from state 200 and enters into state 202. While the logic is in state 202 the output of access timer is examined and when the access timer counts to 5 the logic proceeds from state 202 and enters into step 206. Until the access timer counts down to 5 the logic recycles through path 208 and re-enters into state 202. In step 206 one of the data groups present in registers 42 and 44 is sent to the CPU through data switch 18 as an input to register 124 and input stack 112. The data switch 18 as will be discussed herebelow selects either register 42 or 44 as its output to register 124 and input stack storage unit 112. Logic proceeds from step 206 and enters into state 210.

In state 210 logic recycles through path 212 to re-enter state 210 until the output of the access timer is equal to 4. The logic then proceeds and enters into step 214. In step 214 the input stack is loaded at the address provided by channel 114 and register 124 is loaded with the selected output of either register 42 or 44. The logic then proceeds through step 216 and enters into state 218. In step 216 the address provided by input control register 110 is advanced by one data group. The address for loading the input stack is provided to logic unit 78 through channel 118 by the CPU. The CPU designates which particular location within the input stack storage 112 into which each data group is to be loaded. The address is stored within logic unit 78 and is transferred through channel 22 to input control register 110.

While the logic is in state 218 the output of the access timer is tested. If the output of the access timer is not equal to 3 the logic recycles through path 220 and re-enters state 218. When the access timer counts down to 3, the logic proceeds through step 222 and enters into state 224. In step 222 the input stack storage unit 112 and register 124 are loaded with the data group present in either registers 42 or 44, whichever data group was not selected by data switch 18 in step 206. The data switch 18, of course, making the selection of the new data group after the prior data group has been loaded into registers 124 and input stack storage unit 112. In state 224 the output of EDAC circuitry 16 is examined to determine if an error has occurred.

If control unit 24 receives an output the EDAC circuitry 16 has not detected an error, the logic proceeds from state 224 and enters into step 226. In step 226 the address provided by register 110 is advanced by one data group. The logic then proceeds to state 228. In state 228 the access timer is examined to determine if its output is equal to 2. If the output is not equal to 2 the logic recycles through path 230 and re-enters into state 228. When the output of access timer is equal to 2 the logic proceeds through step 234 and enters into state 236. In state 236 the output of EDAC circuitry 16 is examined to determine if an error exists in the data group. If an error does not exist the logic proceeds through step 238 and enters into state 240. In step 238 the address provided by the register 110 to input stack storage unit 112 is advanced to that of the next data group to be loaded.

In state 240 the output of the access timer is examined to determine if it is equal to 1. If it is not equal to 1 the logic recycles through path 242 and re-enters state 240. In step 238 the address provided by the register 110 to input stack storage unit is advanced to the next data group. In state 240 the output of the access timer is examined to determine if it is equal to 1. If it is not equal to 1 t logic recycles through path 242 and re-enters states 240. If the counter has counted down to 1, the logic proceeds from state 240 and enters into state 244 through step 243. In step 243 the data group in registers 42 and 44 not selected and inputted to the register 124 and the input stack storage unit 112 in step 234 now is selected as an input thereto by data switch 18. Also, in step 243 the data group selected is stored into the input stack storage unit 112 and register 124. In state 244 the output of EDAC circuitry 16 is examined to determine if an error exists. If an error does not exist the logic proceeds and enters into step 246. In step 246 the address provided by the input control register to the input stack storage unit 112 is advanced to the next storage location which would represent the location for the first of the next set of four data groups to be stored into the input stack storage unit 112. The logic proceeds from step 246 and enters into state 248.

In state 248 the output of the access timer is examined to determine if it has counted down to 0. If the timer has counted down to 0 the logic cycles through path 250 and enters state 248. From state 248 the logic proceeds when the access timer has counted down to 0 to state 252. In state 252 the output of the EDAC circuitry 16 is examined to determine if a data group is in error by control unit 24. If the data group is not in error the logic proceeds from state 252 and enters state 298.

If while the logic is in state 224 an error in the first data group sent to the input stack storage unit 112 and register 124 is detected the logic proceeds through step 254 and enters state 256. In step 254 the address provided by the input control register to the input stack storage unit 112 becomes the address of the data group in error. While the logic is in state 256, the output of the access timer is examined to determine if the timer has counted down to 2. If the timer has not counted down to 2 the logic recycles through path 258 and re-enters state 256. After the timer has counted down to 2 the logic proceeds through steps 262 and 263 and enters state 265. In step 262 data switch 18 selects the output of register 73 as the input to the input stack storage unit 112 and register 124, and the corrected data group is loaded thereinto. In step 263 which follows step 262 the addresss provided by register 110 is advanced to the next data group. The logic then proceeds to state 265 wherein the output of the access timer is sensed to determine if it has counted down to 1. If the timer has not counted to 1, the logic recycles through path 267 and re-enters state 265. If while the logic is in state 236 an error was detected in the second data group loaded into the input stack storage unit 112 and register 124, the logic proceeds from state 236 and enters state 265 through step 269. In step 269 the address provided by register 110 to the input stack storage unit 112 is reset so that it now points to the data group in error.

After the logic exits state 265, it proceeds through steps 271 and 272 and enters into state 274. After the access timer has counted down to 1 and the logic exits state 265 and enters step 271, register 124 and input stack storage unit 112 are loaded with the output of the register 73. It should be noted that once an error has occurred the output of register 73 is loaded into the input stack storage unit 112 and register 124. If the data group does not contain an error then none of the bits are changed but it is loaded from register 60 through data corrector 71 into register 73 without alteration.

In step 272 the address provided by the register 110 is advanced to the next data group. If while the logic was in state 224 an error was detected in the third data group loaded into input stack storage unit 112 and register 124 the logic proceeds through path 276 and enters into step 278. In step 278 the address provided by register 110 is returned to the address within input stack storage unit 112 for the third data group within the set of four data groups. The logic proceeds to and enters into state 274.

Within state 274 the access timer is examine to determine if its output is 0. If the output is not equal to 0, the logic goes through path 280 and re-enters state 274. After the output of the access timer is equal to 0, the logic proceeds through steps 283, 284, 285 and enters into state 288. In step 283, register 124 and input stack storage unit 112 are loaded with the output of register 73. If the logic had proceeded from state 244 through step 278, the data group would be a corrected data group. If however, the logic had proceeded through steps 271 and 272 the data group loaded from register 273 could either be a corrected data group or the original uncorrected data group which was loaded into register 60. If while the logic was in state 252 an error was detected in the fourth data group of the set of four data groups being loaded into the CPU 34, the logic proceeds through step 290 and enters into state 285. In step 290 the address provided by register 110 is reset to the address of the fourth data group.

While the logic is in step 284 the address provided by register 110 is changed to the address of the next group to be loaded into the input stack storage unit 112. In step 285 another counter called the extension counter is set to 0. It should be noted that this counter counts up. In state 288 the extension counter output is examined to determine if it is equal to 1. If it is not equal to 1, the logic recycles through path 292 and re-enters state 288. After the extension counter has counted to 1 the logic proceeds from state 288 through step 294 and enters into step 296. In step 294 the data group in output register 73 is loaded into register 124 and input stack storage unit 112 through data switch 18. As noted above, the data group can either be a corrected data group or an original data group which did not contain an error. The logic then proceeds from step 294 to step 296. In step 296 the address provided by the register 110 is advanced to the location where the next data group received by the CPU 34 is to be stored. The logic then proceeds from step 296 and enters state 298 above.

The operation of the various units within the EDAC circuitry 16 is shown in FIG. 6. The control functions within the EDAC circuitry 16 are controlled by logic unit 78. The logic begins at state 310. Although this step is not shown there must first be data groups loaded into registers 42 and 44. The logic proceeds from state 310 and enters into state 312. Data switch 50 selects the output of either register 42 or 44. This selection is simultaneous with the selection of data switch 18. In other words the same data group is applied to register 124 and input stack storage unit 112 as is applied to holding register 60 and error detect unit 58. Of course, if data switch 18 has selected register 73 as its output then data switch 50 alone is selecting the outputs of register 42 and 44. However, the same sequencing is maintained as was described in FIG. 5. That is, the CPU has selected a certain sequencing of data groups and data groups in registers 42 and 44 are selected according to that predetermined sequence. If register 42 is to be selected the logic proceeds to step 314 where register 42 is selected and enters into state 316.

If register 44 is to be selected, the logic enters step 318 and the output of register 44 is selected. The logic then proceeds and enters state 316. Within state 316 the output of the access timer is examined to determine if the access timer has counted down to 4. If the timer has not counted down to 4 the logic recycles through path 320 and re-enters state 316. If the timer has counted down to 4, the logic proceeds from state 316 through steps 323 and 324 and enters into state 326. In step 323, register 60 and error detect unit 58 are loaded with the selected data group. In step 324 the data group within registers 42 and 44 which was not selected is now selected as the output of data switch 50. In other words, if step 314 was executed then register 44 is selected. Within state 326 logic unit 78 examines the output of error detect unit 58 on line 63 to determine if an error has been detected. If an error has not been detected in the first data group the logic proceeds through path 328 and enters into state 330.

In state 330, the output of the access timer is examined to determine if the timer has counted down to 3. If the timer has not counted to 3 the logic cycles back through path 332 and re-enters state 330. After the access timer counts to 3, the logic proceeds from state 330 through steps 335 and 336 and enters state 338. In step 335 register 60 and error detect unit 58 are loaded with the next data group. Register 73 is also loaded with the output of corrector 71.

As shown in FIG. 4 during step 182, the next two data groups are latched into registers 42 and 44. Within step 336, the next (third) data group within the predetermined sequence is selected by data switch 50. The logic then proceeds to state 338 wherein a test is made to determine if the error detect unit has found an error. If an error has not been found in the second data group loaded into the error detect unit, the logic proceeds to state 340.

In state 340 a test is made to determine if the access timer has counted to 2. If the access counter has not counted to 2, the logic recycles through path 342 and re-enters state 340. When the access timer has counted down to 2, the logic proceeds through step 344 and enters step 346. In step 344 the data group selected by data switch 50 in step 336 is loaded into register 60 and error detect unit 58. In step 346 data switch 50 selects the other (fourth) data group which was not previously selected. It should be clear that the logic within this particular loop is repetitive and that the sequences of testing and loading will continue until the logic re-enters state 310.

If while the logic was in state 326 an error was detected in the first data group selected, the logic proceeds from state 326 and enters into state 352. In state 352 the output of decoder 69 is examined to determine whether or not the error is a correctable error. If decoder 69 determines from the syndrome generated by error detect unit 58 and stored within syndrome register 65 that the error is correctable the logic proceeds through path 354 and enters into step 356. If the error is determined to be uncorrectable the logic proceeds from state 352 and enters step 358. In step 358 input control unit 120 informs the CPU 34 through line 122 that an uncorrectable error has been detected and that the proper recovery procedures must be initiated. The logic then proceeds from step 358 and enters into state 389.

In step 356 the error is corrected by corrector 71 utilizing the syndrome generated by error detect unit 58 and loaded into syndrome register 65. The corrected data group is loaded into output register 73. The logic then proceeds from step 356 and enters into state 360. In state 360 the output of access timer is examined to determine if the timer has counted down to 2. If the timer has not counted down to 2, the logic proceeds through path 362 and re-enters state 360. When the access timer has counted down to 2, the logic proceeds through steps 365, 366, and 367 and enters into state 369. In state 365 the holding register 60 and error detect unit 58 are loaded with the data group selected by data switch 50. In step 366 the corrected data is loaded into input stack storage unit 112 and register 124 through data switch 18. The next data group is selected by data switch 50 in step 367. If an error is detected in step 338, the logic proceeds through path 371 and enters state 369. In state 369 the output of the decoder is examined by logic unit 78 to determine if the error is correctable. If the error is not correctable the logic proceeds through path 373 and enters into step 375. In step 375 the CPU 34 is notified that an uncorrectable error exists, that the operation must be aborted, and that the appropriate recovery procedures initiated. From step 375 the logic proceeds to and re-enters state 389.

If a correctable error is detected in state 369, the logic proceeds through step 377 and enters into state 379. If in step 377 there is no error to correct the output of holding register 60 is loaded through corrector 71 and placed into register 73 without alteration. In state 379 the output of the access timer is tested to determine if the timer has counted down to 1. If the timer has not counted down to 1, the logic proceeds through path 381 and re-enters state 379.

The logic proceeds from state 379 through steps 384 and 385 and enters into step 387. In step 384 the data group selected by data switch 5 is loaded into error detect unit 58 and register 60. In step 385 the contents of register 73 are loaded via data switch 18 into input stack storage unit 112 and register 124. In step 387 which follows step 385 the next data group is selected in the predetermined sequence by data switch 50. As can be seen from the above situations described, the remainder of the logic is repetitive and the sequence of events remains the same until all of the data groups have been loaded into CPU 34 or an uncorrectable error is detected. The logic then enters into state 389.

The access timer for the next memory cycle, i.e., a block of four data groups to be drawn from memory 10, is started when the access timer of the current cycle counts down 5 counts from its start in step 156 (FIG. 4). If an error has occurred, the next block is loaded from register 73 (FIG. 2) as if an error had occurred in states 224 (FIG. 5) and 326 (FIG. 6).

Whereas the present invention has been described in particular relation to the drawings attached hereto, it should be understood that other and further modifications, apart from those shown or suggested herein, may be made within the spirit and scope of this invention.

What is claimed is:

1. Apparatus for providing data groups from a memory to a destination circuitry comprising:
   a. a first path from said memory to said destination circuitry; and
   b. a second path from said memory to said destination circuitry, said second path including error detection and correction circuitry for detecting at least one data group from said memory having an error therein and substituting a corrected data group therefor; and
   c. a control unit operatively connected to said error detection and correction circuitry and to said destination circuitry for indicating said error, said destination circuitry responding to said control unit to replace said one data group with said corrected data group and to receive subsequent data groups from said error detection and correction circuitry.

2. Apparatus for providing at least one corrected data group, each data group being transferred from a memory comprising:
   a. data switch connected to receive and transfer as an output thereof data groups from said memory;
   b. error detection and correction circuitry operatively connected to said memory and to said data switch for providing each corrected data group to said data switch if one of said data groups contains a correctable error, said data switch responding to said error detection and correction circuitry having corrected said error for receiving and transferring said corrected data group and subsequent data groups in sequence from said error detection and correction circuitry.

3. Apparatus receiving a data stream divided into data groups from a memory in a predetermined sequence, comprising:
   a. error detection and correction circuitry connected to receive said data groups in said predetermined sequence for substituting a corrected data group within said predetermined sequence for each of said data groups having an error therein; and
   b. a data switch operatively connected to selectively transfer said data groups from said memory in said predetermined sequence and
   c. from said error detection and correction circuitry in said predetermined sequence including said corrected data group after a correctable error is detected.

4. Apparatus receiving a data stream divided into data groups in a predetermined sequence from a memory for providing a corrected data group for each data group having an error therein to a destination circuitry, comprising:
   a. an error detection and correction circuitry operatably connected to receive said data stream for substituting within said predetermined sequence corrected data groups corresponding to data groups having errors therein to form a corrected data stream, said error detection and correction circuitry generating signals when a corrected data group is substituted;
   b. a data switch operatively connected to receive said data stream from said memory and to receive said corrected data stream from said error detection and correction circuitry, said data switch connected to said destination circuitry for selectively providing said data stream thereto and in response to said signal for providing said corrected data stream thereto.

5. Apparatus as set forth in claim 4 including a second data switch connected to receive said data stream from said memory in said predetermined sequence and from said error detection and correction circuitry for selectively providing said data stream to a second destination circuitry and in response to said signals said corrected stream thereto.

6. Apparatus as set forth in claim 4 wherein said error detection and correction circuitry produces a first signal if an uncorrectable error is detected and said destination circuitry aborts in response thereto.

7. Apparatus as set forth in claim 4 wherein said error detection and correction circuitry produces a second signal when said corrected data group is substituted and said destination circuitry is opertably connected to receive said second signal for ignoring said data group having an error therein and corresponding to said corrected data group.

8. Apparatus as set forth in claim 4 wherein said error detection and correction circuitry receives an address for each data group within said memory for detecting errors in addressing.

9. An apparatus for providing a corrected data group to a destination circuitry, a stream of data groups being received by said apparatus from a memory, comprising:
   a. an error detection and correction means for detecting an error in one data group for correcting said errors to substitute said corrected data group into said stream for said one data group; and b. a data switch means receiving said stream from said memory for transfer to said destination circuitry and from said error detection and correction means for responding to said error detection and correction means substituting said corrected data group to selectively transfer said stream from said error detection and correction circuitry.

10. A method of providing a corrected data group to a destination circuitry, comprising the steps of:

a. applying a stream of data groups to an error detection and correction circuitry and to a data switch;

b. transferring said stream to said destination circuitry through said data switch;

c. correcting each data group in error by substituting a corresponding correct data group into said stream therefore; and d. selecting said stream from said error detection and correction circuitry for transfer to said destination circuitry in response to a corrected data group being substituted.

* * * * *